US011929033B2

(12) United States Patent
Kim et al.

(10) Patent No.: US 11,929,033 B2
(45) Date of Patent: Mar. 12, 2024

(54) DISPLAY DEVICE

(71) Applicant: LG Display Co., Ltd., Seoul (KR)

(72) Inventors: Taehwi Kim, Busan (KR); Soonsung Ahn, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/966,584

(22) Filed: Oct. 14, 2022

(65) Prior Publication Data

US 2023/0206852 A1 Jun. 29, 2023

(30) Foreign Application Priority Data

Dec. 27, 2021 (KR) ........................ 10-2021-0188205

(51) Int. Cl.
*G09G 3/3266* (2016.01)
*G09G 3/3233* (2016.01)

(52) U.S. Cl.
CPC ... *G09G 3/3266* (2013.01); *G09G 2300/0852* (2013.01); *G09G 2310/08* (2013.01)

(58) Field of Classification Search
CPC ........................... G09G 3/3677; G09G 3/3266
See application file for complete search history.

(56) References Cited

U.S. PATENT DOCUMENTS 10,078,995 B2 * 9/2018 Kim .......................... G09G 5/00
10,629,133 B2 * 4/2020 Kim .................... H01L 27/1251
2011/0013740 A1 * 1/2011 Lin ........................ G11C 19/28 377/79
2017/0110050 A1 * 4/2017 Park ...................... G09G 3/3266
2019/0035322 A1 * 1/2019 Kim ...................... G09G 3/3233
2022/0020332 A1 * 1/2022 Yang ..................... G09G 3/3233
2022/0051633 A1 * 2/2022 Li ......................... G09G 3/3266
2022/0366855 A1 * 11/2022 Chang .................... G11C 19/28

FOREIGN PATENT DOCUMENTS

KR 20190058087 A 5/2019

* cited by examiner

*Primary Examiner* — Sepehr Azari
(74) *Attorney, Agent, or Firm* — Seed IP Law Group LLP

(57) ABSTRACT

A display device is disclosed by the present disclosure. The display device includes: a display panel having a plurality of sub-pixels, the sub-pixels being connected to a plurality of scan lines and a plurality of data lines; and a gate driver for supplying a scan signal at a high level to the plurality of scan lines. The gate driver may include: a first gate driver for outputting a carry signal at a low level; a second gate driver for outputting the scan signal at the high level based on the carry signal; a first clock signal line connected to the first and the second gate driver; and a second clock signal line connected to the first and the second gate driver. Accordingly, the gate driver can generate a high-level scan signal based on the low-level carry signal from the first gate driver.

9 Claims, 6 Drawing Sheets

DISPLAY DEVICE

CROSS-REFERENCE TO RELATED APPLICATIONS

This application claims priority to Korean Patent Application No. 10-2021-0188205 filed in the Korean Intellectual Property Office on Dec. 27, 2021, the disclosure of which is incorporated herein by reference in its entirety as if fully set forth herein.

TECHNICAL FIELD

The present disclosure relates to a display device, and more particularly, to a display device including a gate driver that can control an n-type transistor.

DESCRIPTION OF THE RELATED ART

Display devices employed by the monitor of a computer, a TV, a mobile phone or the like include an organic light-emitting display (OLED) that emits light by itself, and a liquid-crystal display (LCD) that requires a separate light source.

Such display devices find more and more applications, including computer monitors and televisions, as well as personal portable devices. Accordingly, research is ongoing to develop display devices having a larger display area with reduced volume and weight.

A display device may drive a plurality of sub-pixels using a gate driver supplying a scan signal and a data driver supplying a data voltage. Among these, the gate driver may be formed as a gate in panel (GIP), i.e., the gate drive IC may be incorporated into the display panel.

BRIEF SUMMARY

The inventors have realized that the circuit of the sub-pixels may become complicated depending on the driving scheme of display devices or the internal compensation manner of the sub-pixels. As a result, the elements and area of the gate driver for driving the sub-pixels may increase, making it difficult to reduce the bezel area. The present disclosure provides a display device including a gate driver that can control an n-type transistor.

The present disclosure provides a display device that can output a scan signal at a high level by using the previously used driving timing as it is.

The present disclosure provides a display device that can easily change a scan signal even if the type of transistors of sub-pixels is changed.

Technical benefits of the present disclosure are not limited to the above-mentioned technical benefits, and other technical benefits, which are not mentioned above, can be clearly understood by those skilled in the art from the following descriptions.

According to an aspect of the present disclosure, there is provided a display device including: a display panel having a plurality of sub-pixels defined thereon, the sub-pixels being connected to a plurality of scan lines and a plurality of data lines; and a gate driver for supplying a scan signal at a high level to the plurality of scan lines. The gate driver may include: a first gate driver for outputting a carry signal at a low level; a second gate driver for outputting the scan signal at the high level based on the carry signal; a first clock signal line connected to the first gate driver and the second gate driver; and a second clock signal line connected to the first gate driver and the second gate driver. Accordingly, the gate driver according to the example embodiment of the present disclosure can generate a high-level scan signal based on the low-level carry signal from the first gate driver.

Other detailed matters of the example embodiments are included in the detailed description and the drawings.

According to an example embodiment of the present disclosure, a gate driver that can control an n-type transistor can be formed by adding a circuit to a gate driver that is suitable for controlling a p-type transistor.

According to an example embodiment of the present disclosure, a high-level scan signal can be easily generated using a gate driver with the driving timing which has been verified to be reliable.

According to an example embodiment of the present disclosure, a high-level scan signal can be output by using the driving timing used for outputting a low-level scan signal as it is.

The effects according to the present disclosure are not limited to the contents exemplified above, and more various effects are included in the present specification.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
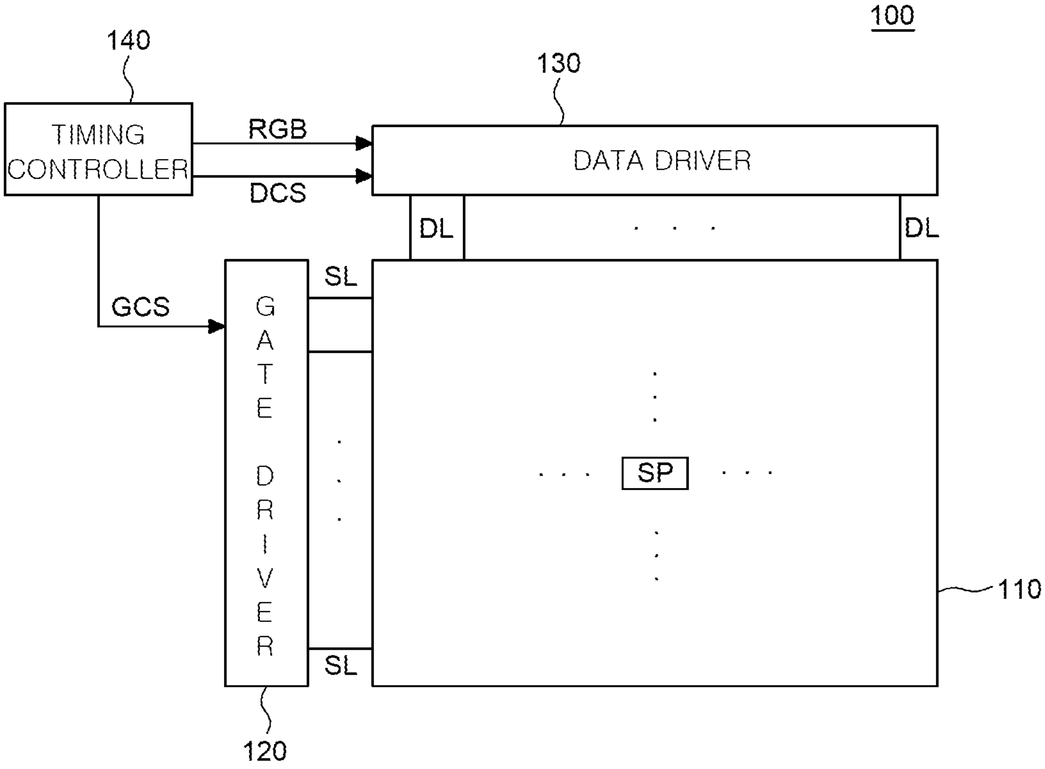
FIG. 1 is a schematic block diagram of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on,” “above,” “below,” and “next,” one or more parts may be positioned between the two parts unless the terms are used with the term “immediately” or “directly.”

When an element or layer is disposed “on” another element or layer, another layer or another element may be interposed directly on the other element or therebetween.

Although the terms “first,” “second,” and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Reference will now be made in detail to embodiments of the present disclosure, examples of which are illustrated in the accompanying drawings. Wherever possible, the same reference numbers may be used throughout the drawings to refer to the same or like parts.

Hereinafter, a display device according to example embodiments of the present disclosure will be described in detail with reference to accompanying drawings.

FIG. 1 is a schematic block diagram of a display device according to an example embodiment of the present disclosure. FIG. 1 shows only a display panel 110, a gate driver 120, a data driver 130 and a timing controller 140 among a variety of elements of the display device 100 for convenience of illustration.

Referring to FIG. 1, the display device 100 includes a display panel 110 including a plurality of sub-pixels SP, a gate driver 120 and a data driver 130 that supply a variety of signals to the display panel 110, and a timing controller 140 that controls the gate driver 120 and the data driver 130.

The gate driver 120 supplies scan signals to a plurality of scan lines SL according to a plurality of gate control signals GCS provided from the timing controller 140. Although one gate driver 120 is disposed on one side of the display panel 110 and spaced apart from it in the example shown in FIG. 1, the number and location of the gate driver 120 are not limited thereto.

The data driver 130 converts image data RGB input from the timing controller 140 into data voltage Vdata using a gamma voltage in response to the data control signals DCS issued from the timing controller 140. The data driver 130 may receive the gamma voltages from a gamma unit, may select a gamma voltage corresponding to the gray level of the image data RGB from among the gamma voltages to generate a data voltage Vdata, and may apply the generated data voltage Vdata to a plurality of data lines DL.

The timing controller 140 aligns the image data RGB input from an external source and supplies it to the data driver 130. The timing controller 140 may generate a gate control signal GCS and a data control signal DCS using a synchronization signal input from an external source, e.g., a dot clock signal, a data enable signal, and a horizontal/vertical synchronization signal. In addition, the timing controller 140 supplies the gate control signal GCS and the data control signal DCS thus generated to the gate driver 120 and the data driver 130, respectively, to control the gate driver 120 and the data driver 130.

The display panel 110 is the element that displays images to a user and includes a plurality of sub-pixels SP. In the display panel 110, the plurality of scan lines SL and the plurality of data lines DL cross each other, and the sub-pixels SP are connected to the scan lines SL and the data lines DL.

Each of the sub-pixels SP is the minimum unit forming the screen, and several sub-pixels SP may be gathered to form a single pixel. Each of the plurality of sub-pixels SP includes a light-emitting element and a pixel circuit for driving the light-emitting element. The plurality of light-emitting elements may be defined differently depending on the type of the display panel 110. For example, where the display panel 110 is an organic light-emitting display panel, the light-emitting elements may be organic light-emitting elements each including an anode, an organic light-emitting layer, and a cathode. Besides, light-emitting diodes (LED) or quantum-dot light-emitting diodes (QLED) including quantum dots QD may be used as the light-emitting elements.

Hereinafter, a sub-pixel SP of the display device 100 according to the example embodiment of the present disclosure will be described in detail with reference to FIG. 2.

Figure 2:
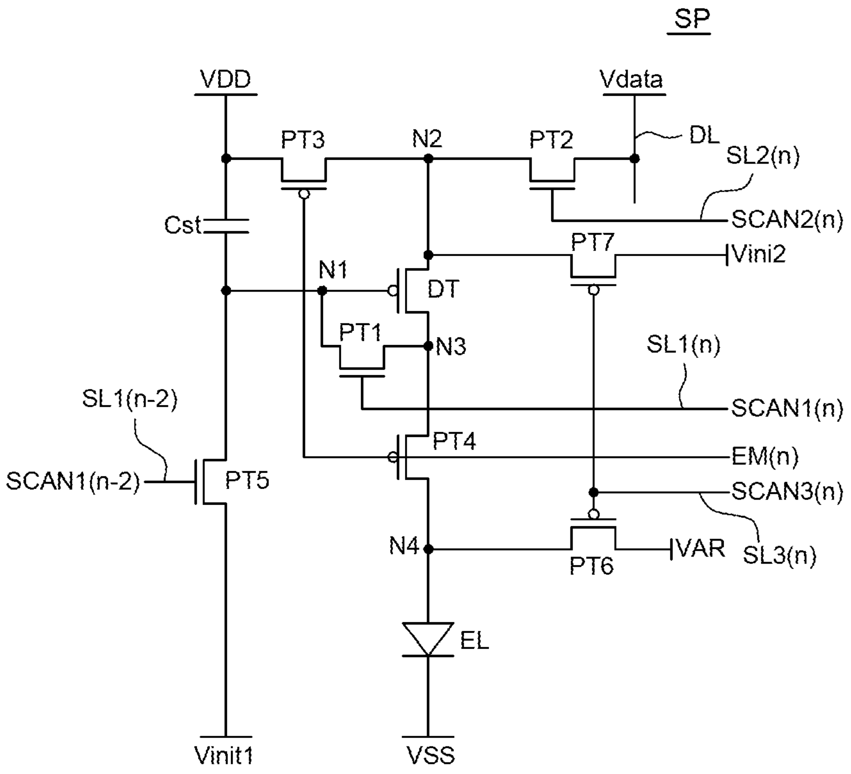
FIG. 2 is a circuit diagram of a sub-pixel of a display device according to an example embodiment of the present disclosure.

FIG. 2 is a circuit diagram of a sub-pixel of a display device according to an example embodiment of the present disclosure.

Referring to FIG. 2, a sub-pixel SP includes a first pixel transistor PT1, a second pixel transistor PT2, a third pixel transistor PT3, a fourth pixel transistor PT4, a fifth pixel transistor PT5, a sixth pixel transistor PT6, a seventh pixel transistor PT7, a driving transistor DT and a storage capacitor Cst. The sub-pixel SP is connected to a data line DL, the plurality of scan lines SL, an emission control signal line, a first initialization line, a second initialization line, an anode reset line, a high potential power voltage line, and a low potential power voltage line.

In the following description, it is assumed that the sub-pixel SP is disposed in the $n^{th}$ row.

The sub-pixel SP includes a plurality of transistors. The plurality of transistors may be implemented as transistors of different types. One of the plurality of transistors may be a transistor including an oxide semiconductor or low-temperature polycrystalline oxide (LTPO) as an active layer. Since the oxide semiconductor material has a low off-current, it is suitable for a switching transistor that has a short turn-on time and a long turn-off time. For example, among the plurality of transistors, the first pixel transistor PT1 and the second pixel transistor PT2 may be transistors using an oxide semiconductor or low-temperature polycrystalline oxide as an active layer.

In particular, in order to drive the display device 100 at a low speed, some of the transistors of the sub-pixel SP may be implemented as oxide semiconductor transistors. Since the length of one frame in a low-speed driving is longer than the length of one frame in a high-speed driving, it is important to keep the voltage at each node of the sub-pixel SP constant. The oxide semiconductor transistor has a very low off-current, which is advantageous to hold the voltage at each node until the next frame. Accordingly, switching transistors such as the first pixel transistor PT1 and the second pixel transistor PT2 may be implemented as oxide semiconductor transistors, to easily hold the voltage at each node of the sub-pixel SP.

Another one of the plurality of transistors may be a transistor using low-temperature poly-silicon (LTPS) as the active layer. Since the polysilicon material has high mobility, low power consumption, and excellent reliability, it may be suitable for the driving transistor DT and the like.

Incidentally, the plurality of transistors may be n-type transistors or p-type transistors. In an n-type transistor, electrons are carriers, and thus electrons may flow from the source electrode to the drain electrode, and electric current may flow from the drain electrode to the source electrode. In a p-type transistor, holes are carriers, and thus holes may flow from the source electrode to the drain electrode, and electric current may flow from the source electrode to the drain electrode. One of the plurality of transistors may be an n-type transistor, and another one of the plurality of transistors may be a p-type transistor.

For example, the first pixel transistor PT1 and the second pixel transistor PT2 may be n-type transistors and transistors using an oxide semiconductor as the active layer. The fifth pixel transistor PT5 may be an n-type transistor and a transistor including low-temperature polysilicon as the active layer. In addition, the driving transistor DT, the third pixel transistor PT3, the fourth pixel transistor PT4, the sixth pixel transistor PT6 and the seventh pixel transistor PT7 may be p-type transistors and may be transistors including low-temperature polysilicon as the active layers. However, the materials forming the active layers of the plurality of transistors and the types of the plurality of transistors are merely illustrative and not limiting.

The first pixel transistor PT1 includes a gate electrode, a source electrode, and a drain electrode. The gate electrode of the first pixel transistor PT1 is connected to the first scan line SL1($n$) of the $n^{th}$ row, and the source electrode and the drain electrode are connected between a first node N1 and a third node N3. The first pixel transistor PT1 may connect the first node N1 with the third node N3 based on the first scan signal SCAN1($n$) of the first scan line SL1($n$) in the $n^{th}$ row.

The second pixel transistor PT2 includes a gate electrode, a source electrode, and a drain electrode. The gate electrode of the second pixel transistor PT2 is connected to the second scan line SL2($n$) of the $n^{th}$ row, and the source electrode and the drain electrode are connected between the second node N2 and the data line DL. The second pixel transistor PT2 may transmit the data voltage Vdata from the data line DL to the second node N2 based on the second scan signal SCAN2($n$) of the second scan line SL2($n$) in the $n^{th}$ row.

The third pixel transistor PT3 includes a gate electrode, a source electrode, and a drain electrode. The gate electrode of the third pixel transistor PT3 is connected to the emission control signal line in the $n^{th}$ row, and the source electrode and the drain electrode are connected between the high potential power voltage line and the second node N2. The third pixel transistor PT3 may transmit the high potential power voltage VDD to the second node N2 based on the emission control signal EM(n) from the emission control signal line in the $n^{th}$ row.

The fourth pixel transistor PT4 includes a gate electrode, a source electrode, and a drain electrode. The gate electrode of the fourth pixel transistor PT4 is connected to the emission control signal line in the $n^{th}$ row, and the source electrode and the drain electrode are connected between the third node N3 and the fourth node N4. The fourth pixel transistor PT4 may transmit a driving current from the driving transistor DT to the light-emitting element EL based on the emission control signal EM(n) from the emission control signal line in the $n^{th}$ row.

The fifth pixel transistor PT5 includes a gate electrode, a source electrode, and a drain electrode. The gate electrode of the fifth pixel transistor PT5 is connected to the first scan line SL1($n$−2) in the $(n-2)^{th}$ row, and the source electrode and the drain electrode are connected between the first initialization line and the storage capacitor Cst and between the first initialization line and the first node N1. The fifth pixel transistor PT5 may transmit a first initialization voltage Vini1 of the first initialization line to the storage capacitor Cst and the first node N1 based on the first scan signal SCAN1($n$−2) of the first scan line SL1 in the $(n-2)^{th}$ row.

The sixth pixel transistor PT6 includes a gate electrode, a source electrode, and a drain electrode. The gate electrode of the sixth pixel transistor PT6 is connected to the third scan line SL3($n$) of the $n^{th}$ row, and the source electrode and the drain electrode are connected between an anode reset line and the fourth node N4. The sixth pixel transistor PT6 may transmit an anode reset voltage VAR of the anode reset line to the fourth node N4 based on the third scan signal SCAN3($n$) of the third scan line SL3($n$) in the $n^{th}$ row. Accordingly, when the sixth pixel transistor PT6 is turned on, the anode of the light-emitting element EL and the fourth node N4 may be initialized to the anode reset voltage VAR.

The seventh pixel transistor PT7 includes a gate electrode, a source electrode, and a drain electrode. The gate electrode of the seventh pixel transistor PT7 is connected to the third scan line SL3($n$) of the $n^{th}$ row, and the source electrode and the drain electrode are connected between the second node N2 and the second initialization line. The seventh pixel transistor PT7 may transmit a second initialization voltage Vini2 of the second initialization line to the second node N2 based on the third scan signal SCAN3($n$) of the third scan line SL3($n$) in the $n^{th}$ row. At this time, the second initialization voltage Vini2 may be an on-bias stress voltage to apply on-bias stress.

By applying on-bias stress, the hysteresis of a transistor can be alleviated. A transistor may have a hysteresis in which characteristics of the transistor change in the current frame depending on the operation state in the previous frame. For example, even when the data voltage Vdata of the same voltage level is supplied to the driving transistor DT, driving currents of different levels may be generated depending on the operating state in the previous frame. Accordingly, by applying on-bias stress to the plurality of transistors, it is possible to initialize the characteristics of the transistors, i.e., the threshold voltage to a certain state. For example, the same on-bias stress may be applied to each of the plurality of sub-pixels SP, so that certain transistors of each of the plurality of sub-pixels SP may be initialized to the same state. Accordingly, all of the sub-pixels SP can emit light of the same luminance in the subsequent frame.

The driving transistor DT includes a gate electrode, a source electrode, and a drain electrode. The gate electrode of the driving transistor DT is connected to the first node N1, and the source electrode and the drain electrode are connected between the second node N2 and the third node N3. When the driving transistor DT is turned on, a driving current is supplied to the light-emitting element EL so that the light-emitting element EL can emit light.

The storage capacitor Cst includes a plurality of capacitor electrodes. Some of the capacitor electrodes are connected to the high potential power voltage line, while the other capacitor electrodes are connected to the first node N1. The storage capacitor Cst stores a voltage between the high potential power voltage VDD and a voltage of the gate electrode of the driving transistor DT so that the driving current from the driving transistor DT can be held while the light-emitting element EL emits light.

The light-emitting element EL includes an anode and a cathode. The anode of the light-emitting element EL is connected to the fourth node N4, and the cathode thereof is connected to a low potential power voltage line from which a low potential power voltage VSS is applied. The light-emitting element EL may emit light in proportion to the driving current from the driving transistor DT.

Incidentally, when the switching transistors such as the first pixel transistor PT1 and the second pixel transistor PT2 are turned off, the voltage at the nearby node may be distorted, resulting kick-back, i.e., the luminance cannot reach the target value. For example, when the second pixel transistor PT2 connected between the source electrode of the driving transistor DT and the data line DL is implemented as a p-type transistor, the data voltage Vdata may decrease due to kickback, and thus it may be difficult to output target luminance. In addition, when the display device 100 is driven in a high-temperature environment or a low-temperature environment, the distortion of the data voltage Vdata due to the kickback may become worse, and thus low-grayscale images may not be displayed normally.

In view of the above, in the display device 100 according to the example embodiment of the present disclosure, the second pixel transistor PT2 connected between the source electrode of the driving transistor DT and the data line DL is implemented as an n-type transistor, so that the data voltage Vdata may increase when the kickback occurs. The data voltage Vdata has a positive value, and luminance fluctuations may become worse when the data voltage Vdata decreases rather than when it increases. As the second pixel transistor PT2 is changed to an n-type transistor, the data voltage Vdata does not decrease even if kickback occurs, so that the luminance fluctuations can be more improved than when a p-type transistor is used.

However, when the second pixel transistor PT2 is changed to an n-type transistor, the second scan signal SCAN2 supplied from the second scan line SL2 has to be changed from a low level to a high level. In view of the above, in the display device 100 according to the example embodiment of the present disclosure, the second gate driver GD2 is added to the gate driver 120, so that the second scan signal SCAN2 at the high level can be generated without changing the existing driving timing of the first gate driver GD1 that generates the second scan signal SCAN2 at the low level.

Hereinafter, the gate driver 120 will be described with reference to FIGS. 3 to 5.

Figure 3:
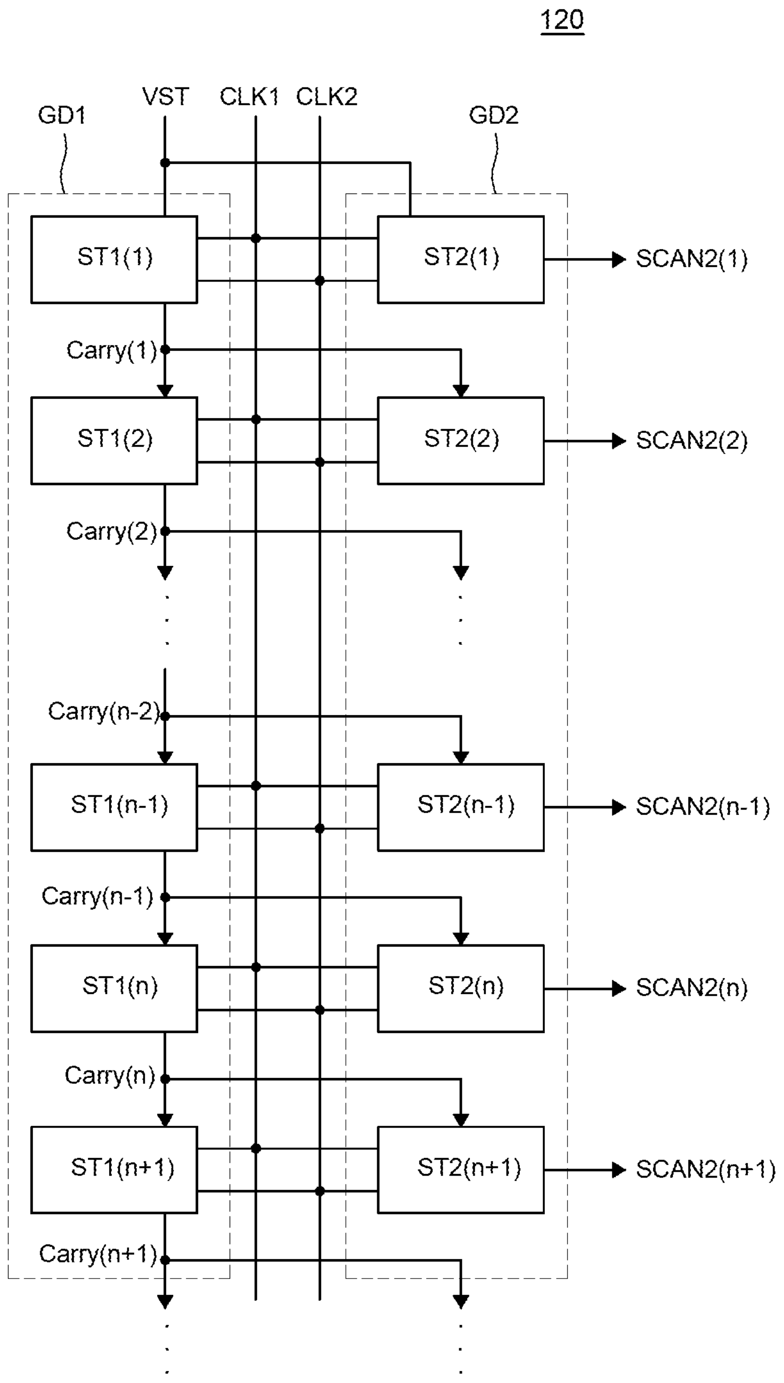
FIG. 3 is a block diagram of a gate driver of a display device according to an example embodiment.
Figure 4A:
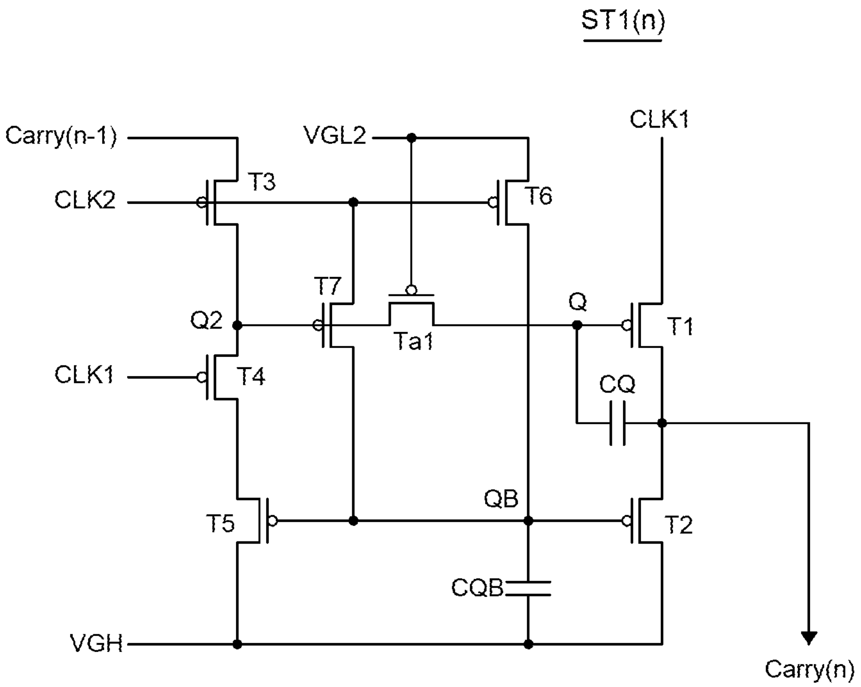
FIG. 4A is a circuit diagram of a first stage of a display device according to an example embodiment of the present disclosure.
Figure 4B:
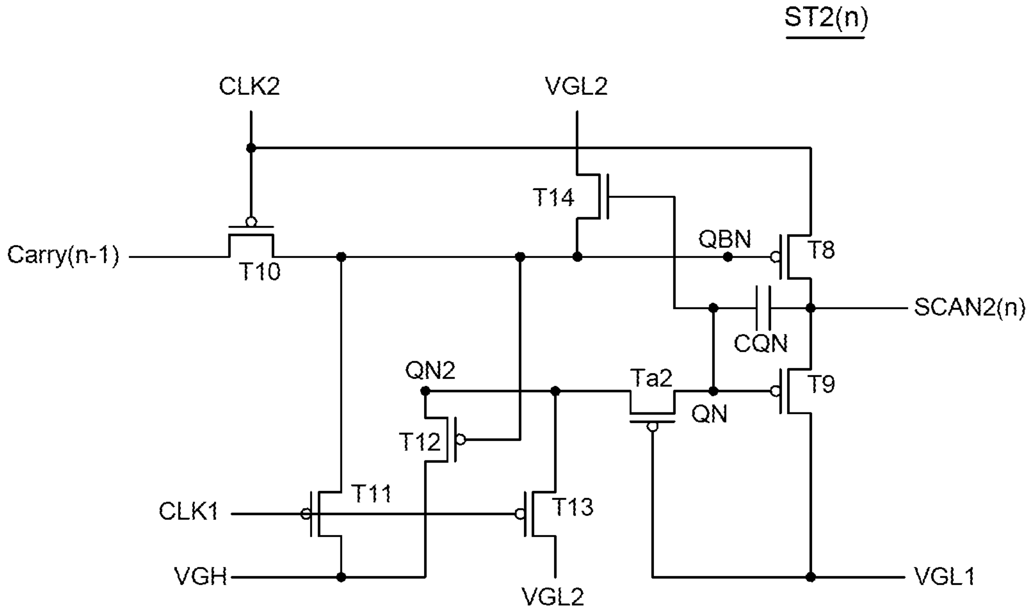
FIG. 4B is a circuit diagram of a second stage of the display device according to the example embodiment of the present disclosure.

FIG. 3 is a block diagram of a gate driver of a display device according to an example embodiment. FIG. 4A is a circuit diagram of a first stage of a display device according to an example embodiment of the present disclosure. FIG. 4B is a circuit diagram of a second stage of the display device according to the example embodiment of the present disclosure. FIG. 5 is a timing diagram of the first stage and the second stage of the display device according to the example embodiment of the present disclosure.

Referring to FIG. 3, the gate driver 120 includes a first gate driver GD1 and a second gate driver GD2.

The first gate driver GD1 is a circuit that outputs a low-level second scan signal to control the second pixel transistor in an existing display device in which the second pixel transistor is implemented as a p-type transistor. Previously, a low-level carry signal Carry output from the first gate driver GD1 is output to the second scan line SL2. In contrast, in the display device 100 according to the example embodiment of the present disclosure, a carry signal Carry at the low-level output from the first gate driver GD1 may be provided to a newly added second gate driver GD2 to generate a second scan signal SCAN2 at the high-level.

The first gate driver GD1 may include a plurality of first stages ST1 connected with one another, and may output a carry signal Carry to the plurality of second stages ST2 of the second gate driver GD2. Each of the plurality of first stages ST1 may output a carry signal Carry based on the carry signal Carry output from the previous first stage ST1, a first clock signal CLK1 and a second clock signal CLK2.

The second gate driver GD2 is an element that outputs the high-level second scan signal SCAN2 to the plurality of second scan lines SL2. The second gate driver GD2 may include a plurality of second stages ST2 connected with one another and sequentially output the second scan signal SCAN2 to the plurality of second scan lines SL2. Each of the plurality of second stages ST2 may output the high-level second scan signal SCAN2 based on the carry signal Carry output from the first stage ST1 of the previous row, the first clock signal CLK1 and the second clock signal CLK2.

For example, the first stage ST1($n$) in the $n^{th}$ row may output a carry signal Carry(n) to the second stage ST2($n$+1) in the (n+1)th row based on a carry signal Carry(n−1) output from the first stage ST1($n$−1) in the $(n-1)^{th}$ row, the first clock signal CLK1 and the second clock signal CLK2.

For example, the second stage ST2($n$) in the $n^{th}$ row may output the second scan signal SCAN2($n$) at the high level to the second scan line SL2($n$) in the $n^{th}$ row based on a carry signal Carry(n−1) output from the first stage ST1($n$−1) in the $(n-1)^{th}$ row, the first clock signal CLK1 and the second clock signal CLK2. In summary, the first stage ST1($n$) in the $n^{th}$ row may output the carry signals Carry(n) to each of the first stage ST1($n$+1) in the (n+1)th row and the second stage ST2($n$+1) in the $(n+1)^{th}$ row.

Since there is no previous first stage ST1 for the first stage ST1(1) and the second stage ST2(1) at the top, they receive a separate start signal from a start signal line VST to generate a carry signal Carry(l) and a second scan signal SCAN2(1).

Hereinafter, the first stage ST1($n$) and the second stage ST2($n$) in the $n^{th}$ row among the plurality of first stages ST1 and the plurality of second stages ST2 will be described.

Referring to FIG. 4A, the first stage ST1($n$) includes a first transistor T1, a second transistor T2, a third transistor T3, a fourth transistor T4, a fifth transistor T5, a sixth transistor T6, a seventh transistor T7, a first auxiliary transistor Ta1, a first capacitor CQ and a second capacitor CQB. In the following description, it is assumed that the first transistor T1 to the seventh transistor T7 and the first auxiliary transistor Ta1 are p-type transistors. It should be understood, however, that the present disclosure is not limited thereto.

The first transistor T1 includes a gate electrode, a source electrode, and a drain electrode. The gate electrode of the first transistor T1 is connected to the Q node, and the source electrode and the drain electrode are connected between a first clock signal line from which a first clock signal CLK1 is provided and a first output terminal from which a carry signal Carry(n) signal is output, respectively.

The second transistor T2 includes a gate electrode, a source electrode, and a drain electrode. The gate electrode of the second transistor T2 is connected to the QB node, and the source electrode and the drain electrode are connected between a gate-high line from which the gate-high voltage VGH is supplied and the first output terminal from which the carry signal Carry(n) signal is output, respectively.

The third transistor T3 includes a gate electrode, a source electrode, and a drain electrode. The gate electrode of the third transistor T3 is connected to a second clock signal line from which the second clock signal CLK2 is provided, and the source electrode and the drain electrode are connected between the first output terminal of the first stage ST1(*n*−1) in the (n−1)th row from which the carry signal Carry(n−1) of the previous first stage is output and the Q2 node.

The fourth transistor T4 includes a gate electrode, a source electrode, and a drain electrode. The gate electrode of the fourth transistor T4 is connected to the first clock signal line from which the first clock signal CLK1 is provided, and the source electrode and the drain electrode are connected between the fifth transistor T5 and the Q2 node.

The fifth transistor T5 includes a gate electrode, a source electrode, and a drain electrode. The gate electrode of the fifth transistor T5 is connected to the QB node, and the source electrode and the drain electrode are connected between the gate-high line from which the gate-high voltage VGH is supplied and the fourth transistor T4.

The sixth transistor T6 includes a gate electrode, a source electrode, and a drain electrode. The gate electrode of the sixth transistor T6 is connected to the second clock signal line, and the source electrode and the drain electrode thereof are connected between a second gate-low line from which the second gate-low voltage VGL2 is provided and the QB node.

The seventh transistor T7 includes a gate electrode, a source electrode, and a drain electrode. The gate electrode of the seventh transistor T7 is connected to the Q2 node, and the source electrode and the drain electrode thereof are connected between the second clock signal line and the QB node.

The first auxiliary transistor Ta1 includes a gate electrode, a source electrode, and a drain electrode. The gate electrode of the first auxiliary transistor Ta1 is connected to the second gate-low line, and the source electrode and the drain electrode thereof are connected between the Q2 node and the Q node. The first auxiliary transistor Ta1 may have the gate electrode connected to the second gate-low line and always remain turned on. The first auxiliary transistor Ta1 may have the source electrode and the drain electrode connected to the Q2 node and the Q node, so that the voltages at the Q2 node and the Q node can be substantially maintained. At this time, the second gate-low voltage VGL2 of a level lower than the first gate-low voltage VGL1 is input to the gate electrode of the first auxiliary transistor Ta1, to prevent the voltage of the Q node from leaking toward the Q2 node.

The first capacitor CQ is connected between the Q node and the first output terminal from which the carry signal Carry(n) is output. The first capacitor CQ may store the voltage at the Q node.

The second capacitor CQB is connected between the QB node and the gate-high line. The second capacitor CQB may store the voltage at the QB node.

Referring to FIG. 4B, the second stage ST2 includes an eighth transistor T8, a ninth transistor T9, a tenth transistor T10, an eleventh transistor T11, a twelfth transistor T12, a thirteenth transistor T13, a fourteenth transistor T14, a second auxiliary transistor Ta2 and a third capacitor CQN. In the following description, it is assumed that the eighth transistor T8 to the thirteenth transistor T13 and the second auxiliary transistor Ta2 are p-type transistors, while the fourteenth transistor T14 is an n-type oxide semiconductor transistor. It should be understood, however, that the present disclosure is not limited thereto.

The eighth transistor T8 includes a gate electrode, a source electrode, and a drain electrode. The gate electrode of the eighth transistor T8 is connected to a QBN node, and the source electrode and the drain electrode are connected between the second clock signal line and a second output terminal from which the second scan signal SCAN2(*n*) is output.

The ninth transistor T9 includes a gate electrode, a source electrode, and a drain electrode. The gate electrode of the ninth transistor T9 is connected to a QN node, and the source electrode and the drain electrode thereof are connected between the first gate-low line from which the first gate-low voltage VGL1 is provided and the second output terminal from which the second scan signal SCAN2(*n*) is output.

The tenth transistor T10 includes a gate electrode, a source electrode, and a drain electrode. The gate electrode of the tenth transistor T10 is connected to the second clock signal line, and the source electrode and the drain electrode are connected between the first output terminal of the first stage ST1(*n*−1) of the (n−1)$^{t}$ row from which the carry signal Carry(n−1) of the previous first stage is output and the QBN node.

The eleventh transistor T11 includes a gate electrode, a source electrode, and a drain electrode. The gate electrode of the eleventh transistor T11 is connected to the first clock signal line, and the source electrode and the drain electrode are connected between the gate-high line and the QBN node.

The twelfth transistor T12 includes a gate electrode, a source electrode, and a drain electrode. The gate electrode of the twelfth transistor T12 is connected to the QBN node, and the source electrode and the drain electrode are connected between the gate-high line and a QN2 node.

The thirteenth transistor T13 includes a gate electrode, a source electrode, and a drain electrode. The gate electrode of the thirteenth transistor T13 is connected to the first clock signal line, and the source electrode and the drain electrode are connected between the second gate-low line and the QN2 node.

The fourteenth transistor T14 includes a gate electrode, a source electrode, and a drain electrode. The gate electrode of the fourteenth transistor T14 is connected to one end of the third capacitor CQN and the QN node, and the source electrode and the drain electrode are connected between the second gate-low line and the QBN node.

The second auxiliary transistor Ta2 includes a gate electrode, a source electrode, and a drain electrode. The gate electrode of the second auxiliary transistor Ta2 is connected to the first gate-low line, and the source electrode and the drain electrode are connected between the QN2 node and the QN node. The second auxiliary transistor Ta2 may have the gate electrode connected to the first gate-low line and always remain turned on. The second auxiliary transistor Ta2 may have the source electrode and the drain electrode connected to the QN2 node and the QN node, so that the voltages at the QN2 node and the QN node can be substantially maintained. The second auxiliary transistor Ta2 can prevent the voltage at the QN node from leaking toward the QN2 node when the second stage ST2 is driven.

Incidentally, when the $n^{th}$ row in which the first stage ST1 and the second stage ST2 are arranged is the first row, the third transistor T3 of the first stage ST1 and the tenth transistor T10 of the second stage ST2 may be connected to the start signal line VST.

Figure 5:
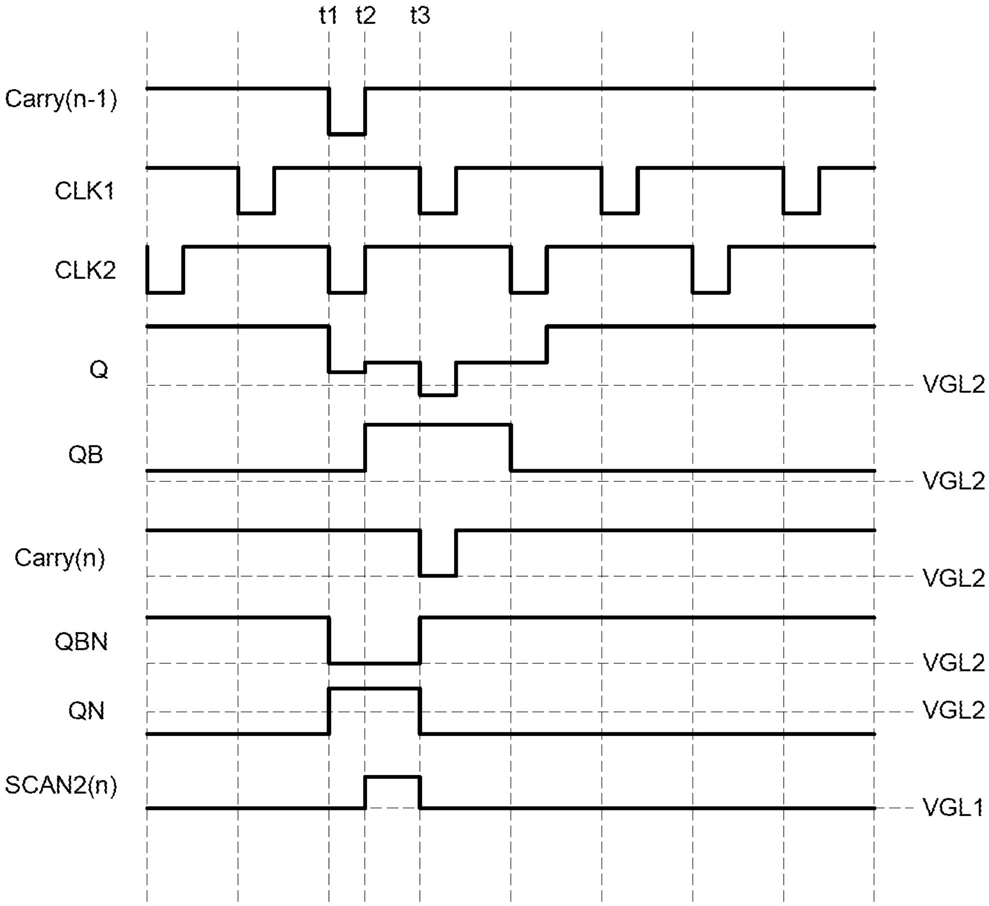
FIG. 5 is a timing diagram of the first stage and the second stage of the display device according to the example embodiment of the present disclosure.

Referring to FIGS. 4A and 5, at a first time t1, a carry signal Carry(n−1) is output from the first output terminal of the first stage ST1($n$−1) in the $(n-1)^{th}$ row, and the second clock signal CLK2 at the low level is provided from the second clock signal line.

In this instance, in the first stage ST1, the third transistor T3 is turned on by the second clock signal CLK2 so that the carry signal Carry(n−1) is transmitted from the previous first stage ST1 to the Q2 node and the Q node. At this time, since the first auxiliary transistor Ta1 between the Q2 node and the Q node is always turned on, the carry signal Carry(n−1) transmitted to the Q2 node may be transmitted to the Q node through the first auxiliary transistor Ta1.

Then, in the first stage ST1, the sixth transistor T6 is turned on by the second clock signal CLK2 so that the second gate-low voltage VGL2 of the second gate-low line is transmitted to the QB node. The second transistor T2 and the fifth transistor T5 are turned on by the second gate-low voltage VGL2 at the QB node. Accordingly, the high-level first clock signal CLK1 and the gate-high voltage VGH may be output to the first output terminal through the turned-on second transistor T2 and the turned-on first transistor T1.

Subsequently, when the second clock signal CLK2 is at the high level at a second time t2, the Q node of the first stage ST1 may float. Then, at the third time t3, the low-level first clock signal CLK1 is transmitted from the source electrode to the drain electrode of the first transistor T1, and the voltage at the Q node may change to a voltage lower than the second clock signal CLK2 and the second gate-low voltage VGL2 by the first capacitor CQ as a bootstrap capacitor. As a result, the voltage at the Q node is lowered, the first transistor T1 can stably remain turned on, and the first clock signal CLK1 may be output to the first output terminal through the first transistor T1. Accordingly, the low-level first clock signal CLK1 may be output as the carry signal Carry(n) through the first transistor T1 that remains turned on by the voltage at the Q node. At this time, the high-level voltage is applied to the QB node to keep the second transistor T2 turned off, so that the gate-high voltage VGH is not transmitted to the first output terminal.

Referring to FIGS. 4B and 5, at the first time t1, a carry signal Carry(n−1) is provided from the first output terminal of the first stage ST1($n$−1) in the $(n-1)^{th}$ row to the second stage ST2($n$), and a low-level second clock signal CLK2 is provided from the second clock signal line.

The tenth transistor T10 of the second stage ST2 may be turned on by the low-level second clock signal CLK2, and the low-level carry signal Carry(n−1) is transmitted to the gate electrode of the twelfth transistor T12 through the turned-on tenth transistor T10. The gate-high voltage VGH may be transmitted to the QN2 node and the QN node through the turned-on twelfth transistor T12. The gate-high voltage VGH may be stored in the third capacitor CQN, and the ninth transistor T9 may remain turned off for a predetermined period of time.

Then, the fourteenth transistor T14 is turned on by the gate-high voltage VGH transmitted to the QN node, and the second gate-low voltage VGL2 may be transmitted to the gate electrode of the eighth transistor T8 and the QBN node through the turned-on fourteenth transistor T14. The second gate-low voltage VGL2 is supplied to the QBN node to which the gate electrode of the eighth transistor T8 is connected, the eighth transistor T8 may be turned on, and the second clock signal CLK2 at the low level may be output to the second output terminal through the turned-on eighth transistor T8.

Subsequently, at a second time t2, the second clock signal CLK2 may be at the high level, and the high-level second clock signal CLK2 may be output to the second output terminal. Accordingly, the second scan signal SCAN2($n$) at the high level may be generated based on the carry signal Carry(n−1) output from the previous first stage ST1($n$−1), the first clock signal CLK1 and the second clock signal CLK2.

Subsequently, at a third time t3, the first clock signal CLK1 may be at the low level, the eleventh transistor T11 may be turned on, and the gate-high voltage VGH may be transmitted to the QBN node through the turned-on eleventh transistor T11. Accordingly, the QBN node may become the gate-high voltage VGH and the eighth transistor T8 may be turned off.

In addition, at a third time t3, the thirteenth transistor T13 is turned on by the first clock signal CLK1, and the second gate-low voltage VGL2 may be transmitted to the QN node through the turned-on thirteenth transistor T13. At this time, the voltage at the QN node connected to the third capacitor CQN may become lower than the second gate-low voltage VGL2 by bootstrapping. Accordingly, the ninth transistor T9 is turned on, and the first gate-low voltage VGL1 may be output to the second output terminal.

In this manner, in the display device 100 according to the example embodiment of the present disclosure, the second gate driver GD2 for outputting the high-level second scan signal SCAN2 is added to the first gate driver GD1 outputting the low-level carry signal Carry, so that the previously used driving timing of the signals can be used as it is. First, by changing the second pixel transistor PT2 connected between the data line DL and the driving transistor DT as an n-type transistor. it is possible to improve the data voltage Vdata drop due to kickback. However, as the second pixel transistor PT2 is changed from a p-type transistor to an n-type transistor, it is required to output the high-level second scan signal SCAN2 to the second scan line SL2 instead of the low-level. Instead of modifying the existing first gate driver GD1 that outputs a low-level signal to the second scan line SL2 or changing the timing of driving signals, by newly adding the second gate driver GD2, it is possible to generate the second scan signal SCAN2 at the high level with the existing driving signal timing. The second gate driver GD2 may receive the carry signal Carry at the low level output from the first gate driver GD1 to output the second scan signal SCAN2 at the high level to the second scan line SL2. In this instance, the reliability of the output of the second scan signal SCAN2 of the second scan line SL2 can be increased by utilizing the first gate driver GD1 and the driving signal timing which has been verified to be reliable. Accordingly, in the display device 100 according to the example embodiment of the present disclosure, the second gate driver GD2 is added to the first gate driver GD1 that is suitable for a p-type transistor, so that the second scan signal SCAN2 at the high level can be easily output to a plurality of second scan lines SL2 without changing the driving signal timing.

The example embodiments of the present disclosure can also be described as follows:

According to an aspect of the present disclosure, there is provided a display device. The display device includes a display panel having a plurality of sub-pixels defined thereon, the sub-pixels being connected to a plurality of scan lines and a plurality of data lines, and a gate driver for supplying a scan signal at a high level to the plurality of scan lines. The gate driver comprises a first gate driver for outputting a carry signal at a low level, a second gate driver for outputting the scan signal at the high level based on the carry signal, a first clock signal line connected to the first gate driver and the second gate driver, and a second clock signal line connected to the first gate driver and the second gate driver.

The first gate driver may include a plurality of cascaded first stages, and the display device may include a start signal line connected to a top first stage among the plurality of first stages, each of the plurality of first stages other the top first stage may be connected to a first output terminal of a previous one of the plurality of first stages.

The second gate driver may include a plurality of second stages each comprising a second output terminal connected to a respective one of the plurality of scan lines. A top second stage among the plurality of second stages may be connected to the start signal line, and each of the plurality of second stages other than the top second stage may be connected to the first output terminal of the previous one of the plurality of first stages.

The carry signal output from the first stage in an $n^{th}$ row among the plurality of first stages may be transmitted to the first stage in an $(n+1)^{th}$ row among the plurality of first stages and the second stage in the $(n+1)^{th}$ row among the plurality of second stages.

Each of the plurality of first stages may include a first transistor having a gate electrode connected to a Q node, and a source electrode and a drain electrode connected between the first clock signal line and the first output terminal, a second transistor having a gate electrode connected to a QB node and a drain electrode connected to the first output terminal, a third transistor having a gate electrode connected to the second clock signal line and a source electrode and a drain electrode connected between the first output terminal of the previous first stage and a Q2 node, a fourth transistor having a source electrode or a drain electrode connected to the Q2 node, a fifth transistor having a gate electrode connected to the QB node, a sixth transistor having a gate electrode connected to the second clock signal line and a drain electrode connected to the QB node, and a seventh transistor having a gate electrode connected to the Q2 node and the Q node.

When the carry signal is output from the previous first stage and a clock signal at a low level is provided from the second clock signal line, the third transistor may be turned on to transmit the carry signal to the Q node, and the first transistor may be turned on by a voltage at the Q node to output a clock signal from the first clock signal line to the first output terminal.

Each of the plurality of second stages may include an eighth transistor having a gate electrode connected to a QBN node, and a source electrode and a drain electrode connected between the second clock signal line and the second output terminal, a ninth transistor having a gate electrode connected to a QN node and a drain electrode connected to the second output terminal, a tenth transistor having a gate electrode connected to the second clock signal line, and a source electrode and a drain electrode connected between the first output terminal of the previous first stage and the QBN node, an eleventh transistor having a source electrode and a drain electrode connected between the QBN node and a gate-high line from which a gate-high voltage is supplied, a twelfth transistor having a gate electrode connected to the QBN node, and a source electrode and a drain electrode connected between the gate-high line and a QN2 node, a thirteenth transistor having a drain electrode connected to the QN2 node, and a fourteenth transistor having a gate electrode connected to the QN node, and a source electrode and a drain electrode connected to between the QBN node and a gate-low line from which a gate-low voltage is supplied.

When the carry signal is output from the previous first stage and a clock signal at a low level is provided from the second clock signal line, the tenth transistor may transmit the carry signal to the QBN node, and the twelfth transistor may be turned on by the carry signal to transmit the gate-high voltage to the QN node.

When the gate-high voltage is transmitted to the QN node, the fourteenth transistor may be turned on to transmit the gate-low voltage to the QBN node, and the eighth transistor may be turned on by a voltage at the QBN node to output the clock signal from the second clock signal line to the second output terminal.

Each of the plurality of first stages further may include a first capacitor connected between the Q node and the first output terminal, and a second capacitor connected to the QB node. Each of the plurality of second stages may include a third capacitor connected between the QN node and the second output terminal. The first transistor may remain turn on by the first capacitor when the carry signal is output, and the ninth transistor may remain turned off by the third capacitor when the scan signal is output.

Each of the plurality of sub-pixels may include a driving transistor having a gate electrode connected to a first node, a source electrode connected to a second node, and a drain electrode connected to a third node, a first pixel transistor having a source electrode and a drain electrode connected between the first node and a third node, and a second pixel transistor having a gate electrode connected to the plurality of scan lines, and a source electrode and a drain electrode connected between the second node and the plurality of data lines. The second pixel transistor may be an n-type oxide semiconductor transistor that is turned on by the high-level scan signal supplied from the plurality of scan lines.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel having a plurality of sub-pixels thereon, the sub-pixels being connected to a plurality of scan lines and a plurality of data lines; and a gate driver for supplying a scan signal at a high level to the plurality of scan lines, wherein the gate driver comprises:

a first gate driver for outputting a carry signal at a low level and including a plurality of cascaded first stages;

a second gate driver for outputting the scan signal at the high level based on the carry signal and including a plurality of second stages each comprising a second output terminal connected to a respective one of the plurality of scan lines;

a first clock signal line connected to the first gate driver and the second gate driver; and a second clock signal line connected to the first gate driver and the second gate driver, wherein the display device comprises a start signal line connected to a top first stage among the plurality of first stages and a top second stage among the plurality of second stages, each of the plurality of first stages other than the top first stage is connected to a first output terminal of a previous one of the plurality of first stages, and each of the plurality of second stages other than the top second stage is connected to the first output terminal of the previous one of the plurality of first stages, wherein each of the plurality of first stages comprises:

a first transistor having a gate electrode connected to a Q node, and a source electrode and a drain electrode connected between the first clock signal line and the first output terminal;

a second transistor having a gate electrode connected to a QB node and a drain electrode connected to the first output terminal;

a third transistor having a gate electrode connected to the second clock signal line and a source electrode and a drain electrode connected between the first output terminal of the previous first stage and a Q2 node;

a fourth transistor having a source electrode or a drain electrode connected to the Q2 node:

a fifth transistor having a gate electrode connected to the QB node;

a sixth transistor having a gate electrode connected to the second clock signal line and a drain electrode connected to the QB node; and a seventh transistor having a gate electrode connected to the Q2 node and the Q node.

2. The display device of claim 1, wherein the carry signal output from the first stage in an nth row among the plurality of first stages is transmitted to the first stage in an (n+1)th row among the plurality of first stages and the second stage in the (n+1)th row among the plurality of second stages.

3. The display device of claim 1, wherein when the carry signal is output from the previous first stage and a clock signal at a low level is provided from the second clock signal line, the third transistor is turned on to transmit the carry signal to the Q node, and the first transistor is turned on by a voltage at the Q node to output a clock signal from the first clock signal line to the first output terminal.

4. The display device of claim 1, wherein each of the plurality of second stages comprises:

an eighth transistor having a gate electrode connected to a QBN node, and a source electrode and a drain electrode connected between the second clock signal line and the second output terminal;

a ninth transistor having a gate electrode connected to a QN node and a drain electrode connected to the second output terminal;

a tenth transistor having a gate electrode connected to the second clock signal line, and a source electrode and a drain electrode connected between the first output terminal of the previous first stage and the QBN node;

an eleventh transistor having a source electrode and a drain electrode connected between the QBN node and a gate-high line from which a gate-high voltage is supplied;

a twelfth transistor having a gate electrode connected to the QBN node, and a source electrode and a drain electrode connected between the gate-high line and a QN2 node;

a thirteenth transistor having a drain electrode connected to the QN2 node; and a fourteenth transistor having a gate electrode connected to the QN node, and a source electrode and a drain electrode connected to between the QBN node and a gate-low line from which a gate-low voltage is supplied.

5. The display device of claim 4, wherein when the carry signal is output from the previous first stage and a clock signal at a low level is provided from the second clock signal line, the tenth transistor transmits the carry signal to the QBN node, and the twelfth transistor is turned on by the carry signal to transmit the gate-high voltage to the QN node.

6. The display device of claim 5, wherein when the gate-high voltage is transmitted to the QN node, the fourteenth transistor is turned on to transmit the gate-low voltage to the QBN node, and the eighth transistor is turned on by a voltage at the QBN node to output the clock signal from the second clock signal line to the second output terminal.

7. The display device of claim 4, wherein each of the plurality of first stages further comprises:

a first capacitor connected between the Q node and the first output terminal; and a second capacitor connected to the QB node, wherein each of the plurality of second stages comprises:

a third capacitor connected between the QN node and the second output terminal, wherein the first transistor remains turn on by the first capacitor when the carry signal is output, and wherein the ninth transistor remains turned off by the third capacitor when the scan signal is output.

8. The display device of claim 1, wherein each of the plurality of sub-pixels comprises:

a driving transistor having a gate electrode connected to a first node, a source electrode connected to a second node, and a drain electrode connected to a third node;

a first pixel transistor having a source electrode and a drain electrode connected between the first node and a third node; and a second pixel transistor having a gate electrode connected to the plurality of scan lines, and a source electrode and a drain electrode connected between the second node and the plurality of data lines, wherein the second pixel transistor is an n-type oxide semiconductor transistor that is turned on by the high-level scan signal supplied from the plurality of scan lines.

9. A gate driver for controlling an n-type transistor with the driving timing for controlling a p-type transistor comprising:

a first gate driver for outputting a carry signal at a low level and including a plurality of cascaded first stages;

a second gate driver for outputting a scan signal at a high level based on the carry signal and including a plurality of second stages each comprising a second output terminal;

a first clock signal line connected to the first gate driver and the second gate driver; and a second clock signal line connected to the first gate driver and the second gate driver, wherein the gate driver comprises a start signal line connected to a top first stage among the plurality of first stages and a top second stage among the plurality of second stages, each of the plurality of first stages other than the top first stage is connected to a first output terminal of a previous one of the plurality of first stages, and each of the plurality of second stages other than the top second stage is connected to the first output terminal of the previous one of the plurality of first stages, wherein each of the plurality of first stages comprises:

a first transistor having a gate electrode connected to a Q node, and a source electrode and a drain electrode connected between the first clock signal line and the first output terminal;

a second transistor having a gate electrode connected to a QB node and a drain electrode connected to the first output terminal;

a third transistor having a gate electrode connected to the second clock signal line and a source electrode and a drain electrode connected between the first output terminal of the previous first stage and a Q2 node;

a fourth transistor having a source electrode or a drain electrode connected to the Q2 node;

a fifth transistor having a gate electrode connected to the QB node;

a sixth transistor having a gate electrode connected to the second clock signal line and a drain electrode connected to the QB node; and a seventh transistor having a gate electrode connected to the Q2 node and the Q node.

* * * * *